United States Patent [19]

Kelly, III

[11] Patent Number: 4,969,268

[45] Date of Patent: Nov. 13, 1990

[54] KITCHEN UTENSIL

[75] Inventor: J. Joseph Kelly, III, Easton, Md.

[73] Assignee: The Kelly Company, Inc., Denton, Md.

[21] Appl. No.: 310,533

[22] Filed: Feb. 13, 1989

[51] Int. Cl.$^5$ .............................................. A47J 43/28
[52] U.S. Cl. ................................... 30/322; 16/110 R; 16/DIG. 18; 30/324; 30/345; 294/7
[58] Field of Search .................... 30/141–150, 30/322–328, 340, 343, 345, 169; 16/110 R, DIG. 18, DIG. 19; 81/489; D7/654, 664; 294/55, 55.5, 7

[56] References Cited

U.S. PATENT DOCUMENTS

D. 209,858  1/1968  Erenhouse ........................ D7/654
3,271,856   9/1966  Rowley ............................. 30/324
4,016,315   4/1977  Szabo .......................... 16/DIG. 18 X
4,468,831   9/1984  Schneider ........................... 30/169

Primary Examiner—Douglas D. Watts
Attorney, Agent, or Firm—Norman S. Blodgett; Gerry A. Blodgett

[57] ABSTRACT

A "woodenware" kitchen utensil which has a functional head which is integrally connected to an elongated handle. The utensil has a core of cellular polyolefin which is covered by a skin of solid polyolefin and which has the outer shape of the desired kitchen utensil. The invention also consists of the method of making the kitchen utensil by plasticizing a mixture of polyolefin and a blowing agent in an extruder and injecting the plasticized mixture into a mold cavity having the shape of the article to be formed.

4 Claims, 4 Drawing Sheets

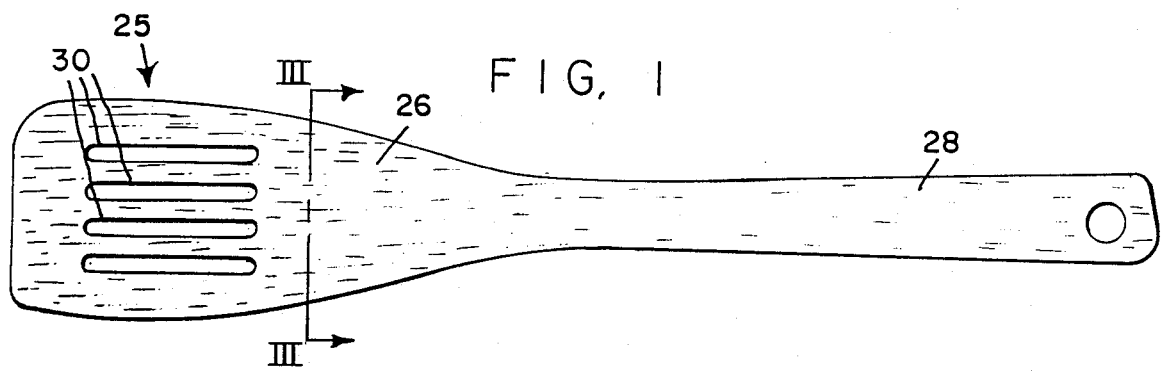
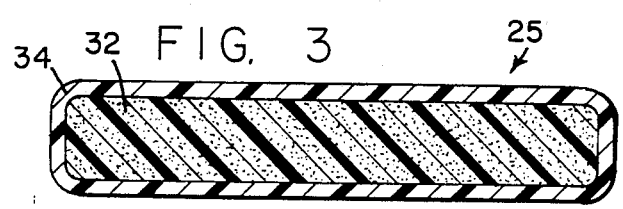
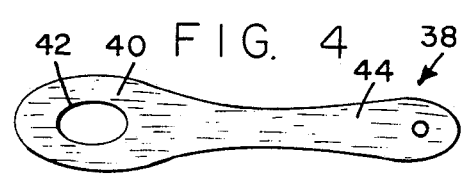
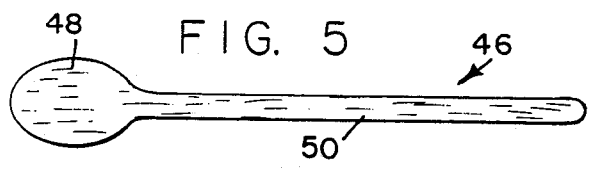
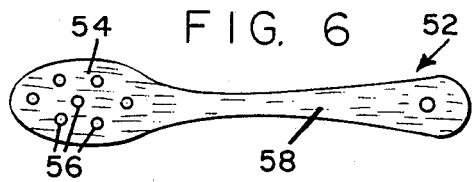
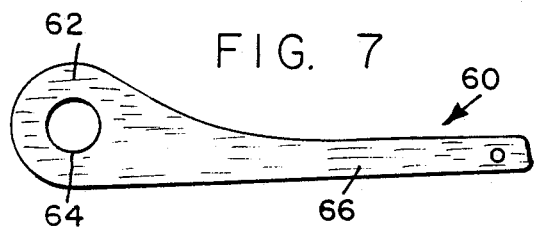
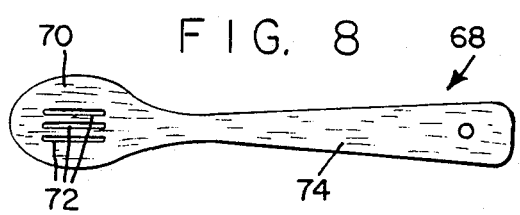

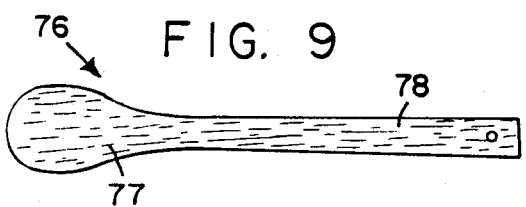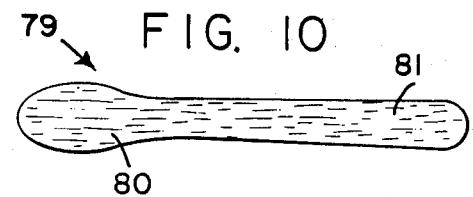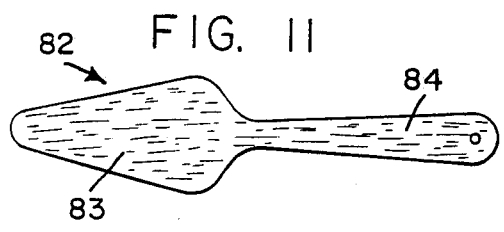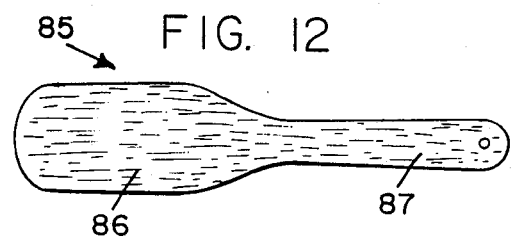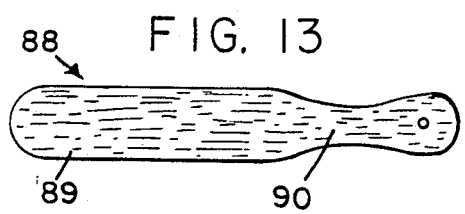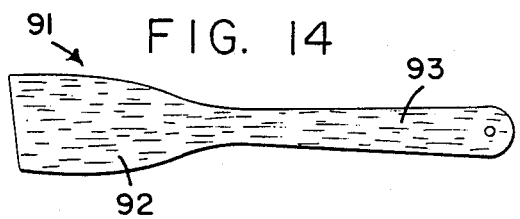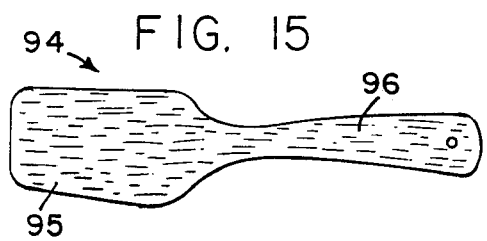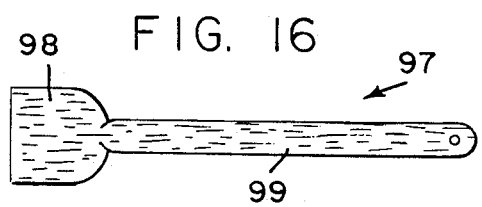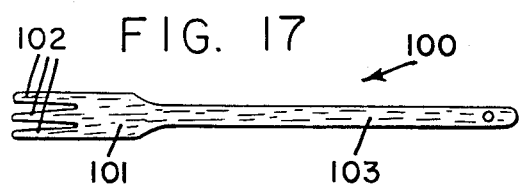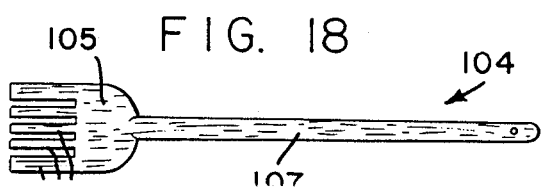

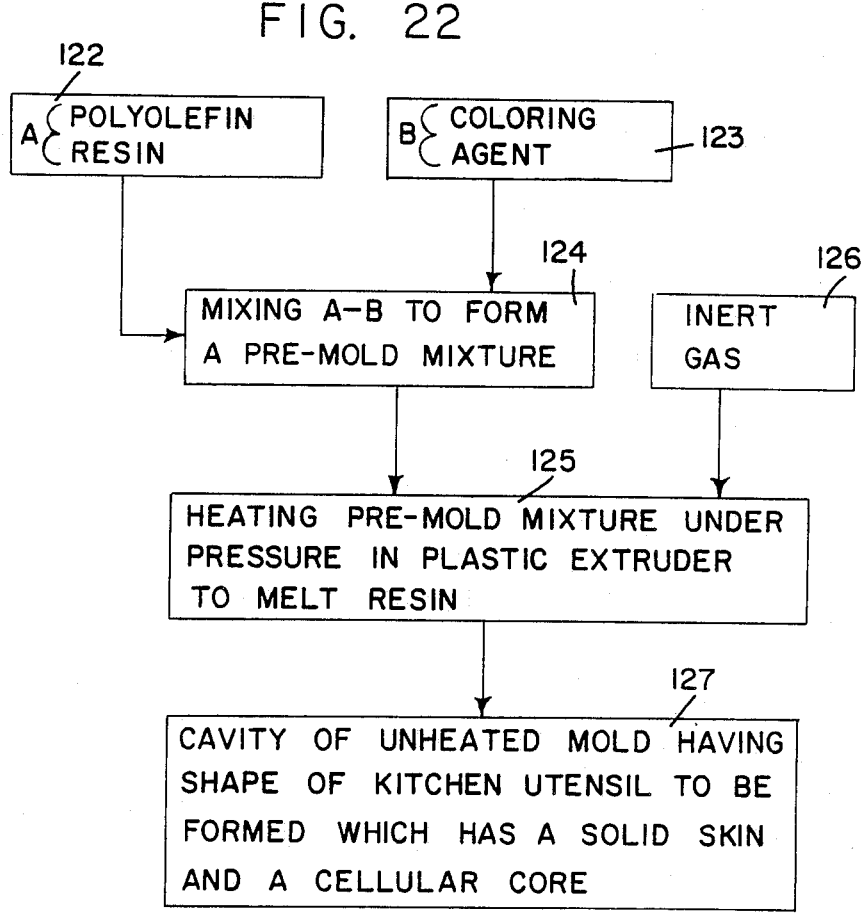

KITCHEN UTENSIL

BACKGROUND OF THE INVENTION

The present invention is a type of kitchen utensil which is commonly referred to as "kitchenware" or "woodenware", which is normally used in the preparation of food. "Woodenware" or "kitchenware" includes such items as spatulas and spoons of various configurations.

Woodenware items, as the name applies, traditionally have been made of wood. Although wood, "Woodenware" is still preferred by traditionalists because it has a desired feel and is stiff enough to perform the functions for which the woodenware items were designed. One disadvantage of wood is that its natural porosity, due to its grain structure, enables the wood to absorb water and other fluids so that there is a tendency for bacterial contamination. Conscientious washing helps to prevent bacterial contamination. However, wood does not dry very readily and cleaning fluids are likely to be absorbed by the wood and then transferred to the food when used subsequently.

Many woodenware items have been made from various plastic materials with less than satisfactory results. At the present time, the two materials which have had some degree of acceptance with formation of woodenware items are nylon and polycarbonate. The disadvantages of nylon are that it is very expensive and absorbs water and other fluids so that nylon has many of the contamination problems of wood. Woodenware items made from nylon and polycarbonate are smooth and flexible and do not have the desired look and feel of wood, qualities which are desired by many cooking and baking traditionalists. These and other difficulties experienced with the prior art "woodenware" kitchen utensils have been obviated by the present invention.

It is therefore a principal object of the invention to provide a woodenware/kitchenware utensil which is made of a material that has the look and feel of wood, is stiff enough to perform the intended task of the utensil and flexible enough to allow the user to feel the consistency of the mixed or cooked material, and which does not absorb liquids.

Another object of the invention is the provision of a method of making a structural foam woodenware/kitchenware utensil which has the look and feel of wood with sufficient flexibility that allows the user to feel the consistency of the mixed or cooked material, and which does not absorb liquids.

A further object of the present invention is the provision of a woodenware kitchen utensil made of a plastic material which has many of the desirable qualities of wood such as look and feel and which provides a long life of useful service.

Of these and other objects in view, as will be apparent of those skilled in the art, the invention resides in the combination of parts set forth in the specification and covered by the claims appended hereto.

SUMMARY OF THE INVENTION

In general, the invention consists of a kitchen utensil of the "woodenware" type which has a core of cellular polyolefin and a skin of solid polyolefin surrounding the core which has the outer shape of the desired kitchen utensil. The invention also consists of a method of making a woodenware kitchen utensil of polyolefin using a structural foam process.

BRIEF DESCRIPTION OF THE DRAWINGS

The character of the invention, however, may be best understood by reference to one of its structural forms, as illustrated by the accompanying drawings, in which:

FIG. 1 is a plan view of a "woodenware" kitchen utensil embodying the principle of the present invention, FIG. 2 is a side elevational view of the kitchen utensil, of FIG. 1, FIG. 3 is a vertical cross-sectional view of the kitchen utensil taking along line III - III of FIG. 1 and looking in the direction of the arrows, FIGS. 4-20 are plan views of additional woodenwared kitchen utensils which incorporate the principles of the present invention, FIG. 22 is a second method of making the kitchen utensil which is shown in FIGS. 1-3.

DESCRIPTION OF THE PREFERRED EMBODIMENT

Figure 19:
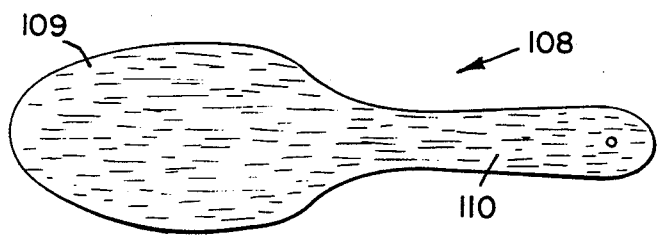

Referring first to FIGS. 1-3, there is shown a "woodenware" kitchen utensil which embodies the principles of the present invention and which is generally indicated by the reference numeral 25. The utensil 25 is a slotted spatula which has a flat head portion 26 and an elongated handle portion 28. The head portion 26 has a plurality of slots 30. The entire outer surface of the spatula has a grainy surface texture 36 which has the grainy appearance and texture of wood. The spatula 25 comprises a core 32 of cellular polyolefin and a skin 34 of solid polyolefin. Polypropylene is the preferred polyolefin but polyethylene is also acceptable. Polyolefin has been considered unacceptable for use as woodenware kitchen utensils due to its lack of stiffness. However, by introducing a foaming agent into the resin a cellular structure is produced which greatly increases the stiffness of the material. As a result, polyolefin has been used to make products which require substantial rigidity. This cellular material has become known as structural foam. The structural foam products have an outer skin of solid polyolefin. Traditionally, structural foams have been used in applications where absolute rigidity is required. However, the polyolefin kitchen utensil 25 of the present invention has a flexural modulas at 73° F. of between 150,000 PSI and 220,000 PSI, 180,000 PSI being the ideal. This is stiff enough to perform its desired functions and, at the same time, has sufficient flexibility to give the user the feel of the consistency of the mixed or cooked materials. Also, the surface texture 36 of the kitchen utensil which is a natural result of the molding process, is graining and has the unexpected look and feel of a wood surface.

Referring to FIGS. 4-20 there are shown additional kitchen utensils of the woodenware type which incorporate the principles of the present invention.

FIG. 4 shows a stirrer, generally indicated by the reference numeral 38, which includes a flat head 42 which has a hole 42 and an elongated handle 44.

FIG. 5 shows an oval spoon, which is generally indicated by the reference numeral 46 and which comprises an oval flat head 48 and an elongated handle 50.

FIG. 6 shows a pierced spoon, which is generally indicated by the reference numeral 52 and which comprises an oval flat head 54 which has a parality of apertures 56 and an elongated handle 58.

Referring to FIG. 7, there is shown a whipping spoon, generally indicated by the reference numeral 60, which comprises a flat oval head 62 which has an aperture 64 and an elongated handle 66.

Referring to FIG. 8, there is shown a slotted spoon, generally indicated by the reference numeral 68, which comprises an oval flat head 70 having a plurality of apertures 72 and a elongated handle 74.

FIG. 9 shows a french spatula, which is generally indicated by the reference numeral 76 and which comprises an oval flat head 77 and elongated handle 78.

Referring to FIG. 10, there is shown a tasting spoon, which is generally indicated by the reference numeral 79 and which comprises an oval flat head 80 and a elongated handle 81.

Referring to FIG. 11, there is shown a triangular spatula which is generally indicated by the reference numeral 82 and which comprises a flat triangular head 83 and a elongated handle 84.

FIG. 12 shows a wide flat spatula, generally indicated by the reference numeral 85, and which comprises a broad flat head 86 and a elongated handle 87.

FIG. 13 shows an icing spatula which is generally indicated by the reference numeral 88 and which comprises of an elongated flat head 89 and a elongated handle 90.

Referring to FIG. 14, there is shown a spatula which is generally indicated by the reference numeral 91 and which comprises a flat head 92 and a elongated handle 93.

Referring to FIG. 15, there is shown a wood turner which is generally indicated by the reference numeral 94 and which comprises a broad flat head 95 and a elongated handle 96.

Referring to FIG. 16, there is shown a potato masher which is generally indicated by the reference numeral 97 and which comprises a head 98 and an elongated handle 99.

Referring to FIG. 17, there is shown a fork which is generally indicated by the reference numeral 100 and which comprises a head 101 having a plurality of tines 102 and a elongated handle 103.

Referring to FIG. 18, there is shown a spaghetti fork which is generally indicated by the reference numeral 104 and which comprises a flat head 105 having a plurality of tines 106 and a elongated handle 107.

Referring to FIG. 19, there is shown an oven shovel which is generally indicated by the reference numeral 108 and which comprises a broad flat head 109 and a elongated handle 110.

Figure 20:
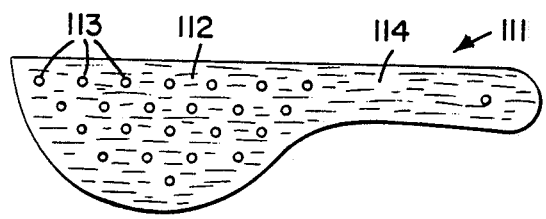

Referring to FIG. 20, there is shown a pot drainer which is generally indicated by the reference numeral 111 and which comprises a broad flat head 112 having a plurality of apertures 113 and a elongated handle 114.

Figure 21:
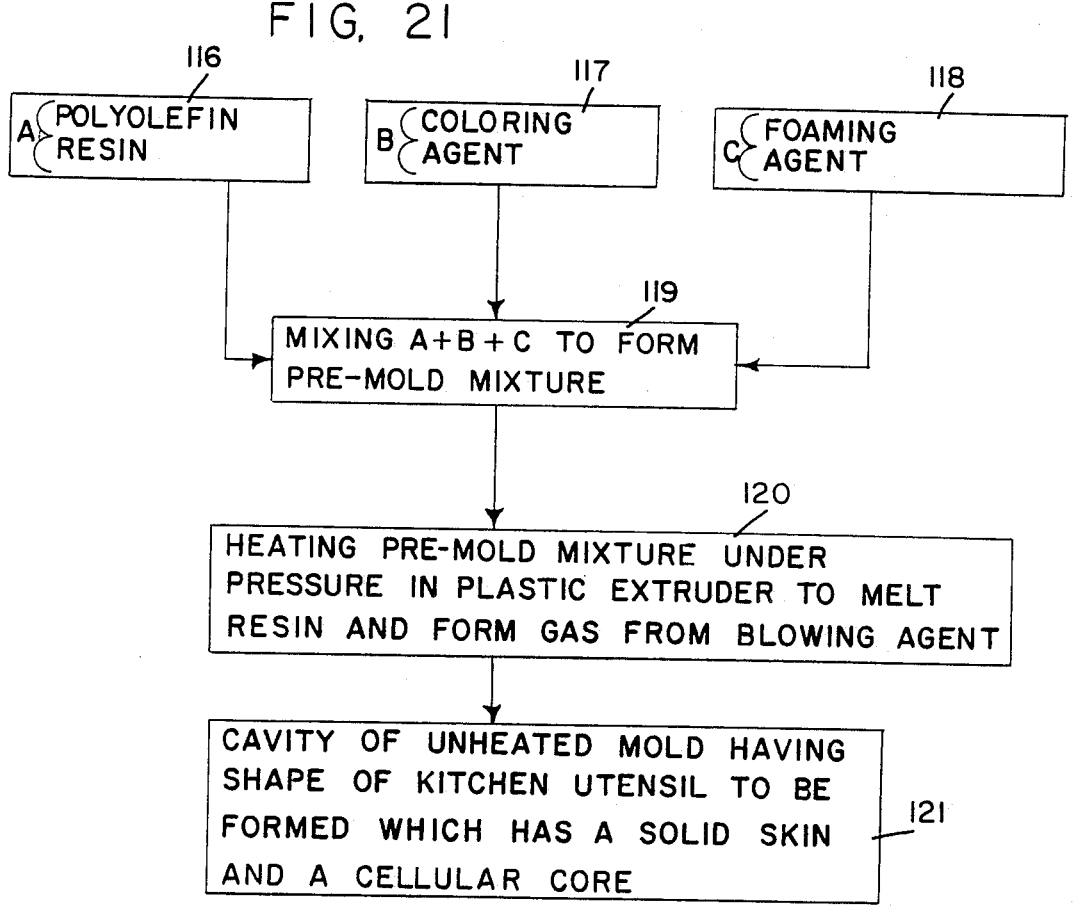
FIG. 21 is a diagrammatic view of a first method of making the kitchen utensil shown in FIGS. 1-3.

Referring to FIG. 21, any of the kitchen utensils of the present invention is made by forming a pre-mold mixture as indicated in block 19 from a quantity of polyolefin resin A, indicated in block 116, a coloring agent B, indicated in block 117, and a blowing agent C, indicated in block 118. The preferred polyolefin resin is polypropylene and ideally a grade of polypropylene which is sold under the trademark FORTILENE of Soltex Polymer Corporation which has a melt flow index of between 4 g/10 min. and 12 g/10 min. as determined by the ASTM D 1238 test method. The preferred blowing agent is an endethermal agent which is distributed by Henley Chemicals, Inc. of New Jersey under the trademark HYDROCEROL BIH and, ideally, HYDROCEROL BIH 70. The pre-mold mixture of A, B, C is introduced into a plastic extruder which melts the resin under pressure and causes the blowing agent to release a gas which remains in solution in the plasticized resin, due to the pressure within the extruder. The plasticized resin and gas mixture is then injected into the cavity of a substantially unheated mold having the shape of the kitchen utensil to be formed, as indicated by block 121. The melt temperature of the pre-mold mixture is between 380° F. and 550° F., the ideal temperature being between 425° F. and 450° F. The injection pressure is between 500 PSI and 20,000 PSI, the ideal injection pressure is between 1,500 PSI and 2,500 PSI. The temperature of the mold is between 30° F. and 175° F., the ideal temperature being between 50° F. and 75° F. The lack of pressure in the mold enables the gas to come out of solution and form tiny bubbles in the plasticized resin which forms a cellular core when the resin hardens. The gas bubbles which reach the outer surface of the material escape so that a solid skin of material is formed about the cellular core.

Referring to FIG. 22 there is shown a modified method of making the kitchen utensil of the present invention. The modified method comprises forming a pre-mold mixture as indicated in block 124 of polyolefin resin A as indicated by block 122 and a coloring agent B as indicated by block 123. The preferred polyolefin is polypropylene and ideally a grade of polypropylene which is sold under the trademark FORTILENE of Soltex Polymer Corporation which has a melt flow index of between 4 g/10 min and 12 g/10 min as determined by the ASTM D 1238 test method. The pre-mold mixture of A & B is introduced into a plastic extruder as indicated by block 125, wherein the mixture is heated under pressure to melt the resin. An inert gas C such as Nitrogen, indicated by block 126, is introduced into the plasticized resin within the extruder and is absorbed in solution by the resin. The gas and resin mixture is then introduced into the cavity of an unheated mold having the shape of the kitchen utensil to be formed, as indicated in block 127. The melt temperature of the pre-mold mixture is between 380° F. and 550° F., the ideal temperature being between 425° F. and 450° F. The injection pressure is between 500 PSI and 20,000 PSI, the ideal injection pressure is between 1,500 PSI and 2,500 PSI. The mold is unpressurized so that the gas comes out of the solution and forms tiny bubbles which combines with the resin as it hardens to form a cellular polyolefin core which is covered by a skin of solid polyolefin.

Clearly, minor changes may be made in the forming construction of the invention without departing from the material spirit thereof It is not, however, desired to confine the invention to the exact form herein shown and described but it is desired to include all such as properly come within the scope claimed.

The invention having been thus described, what is claimed is new and desired to secure by those patented is:

1. A kitchen utensil having a woodenware configuration which includes a functional head which is integrally connected to an elongated handle, said utensil comprising:

(a) a core of cellular polyolefin, and (b) a polyolefin which is integral with and surrounds said core and which has the outer shape of the desired kitchen utensil.

2. A kitchen utensil as recited in claim 1, wherein said utensil has a flexural modulas at 73° F. of between 150,000 PSI and 220,000 PSI.

3. A kitchen utensil as recited in claim 1, wherein said polyolefin is polypropylene.

4. A kitchen utensil as recited in claim 1, wherein the outer surface of said skin has a graining texture.

* * * * *